Oct. 5, 1937. W. C. BUCKNAM 2,095,210
FLUID REGULATOR
Original Filed Dec. 30, 1927 2 Sheets-Sheet 2
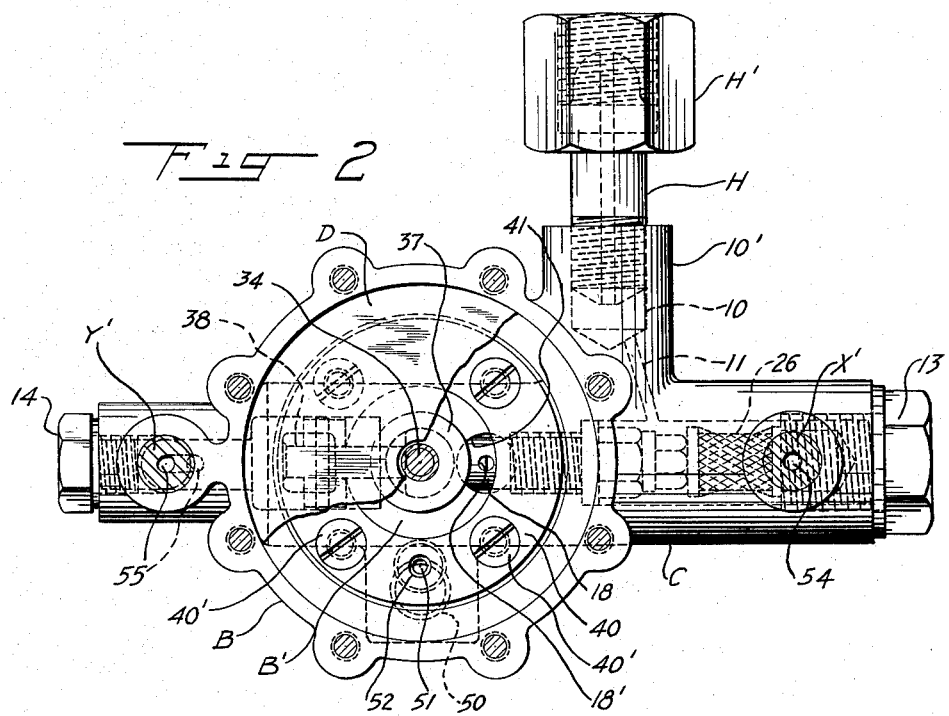
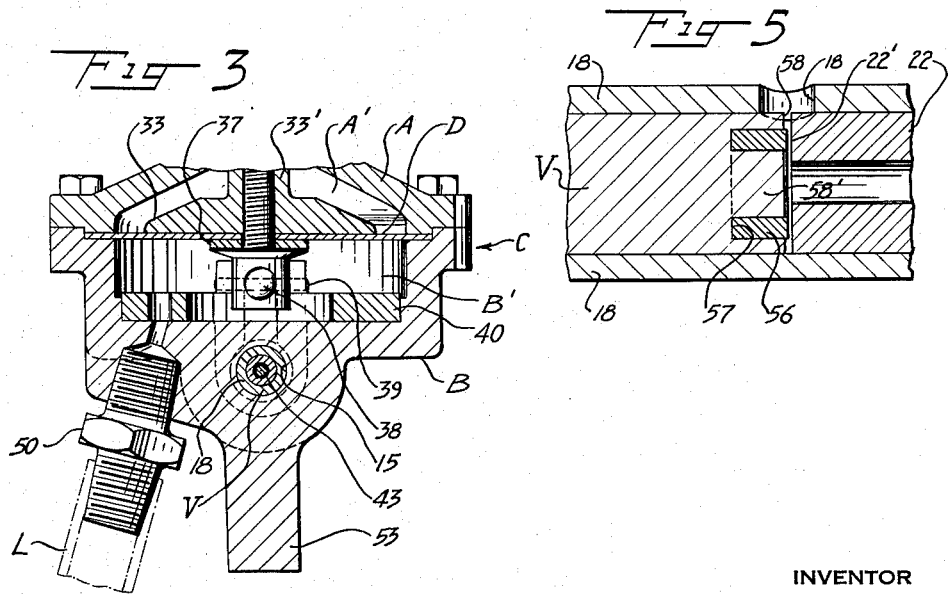
INVENTOR
WORTHY C. BUCKNAM
BY
ATTORNEY Patented Oct. 5, 1937

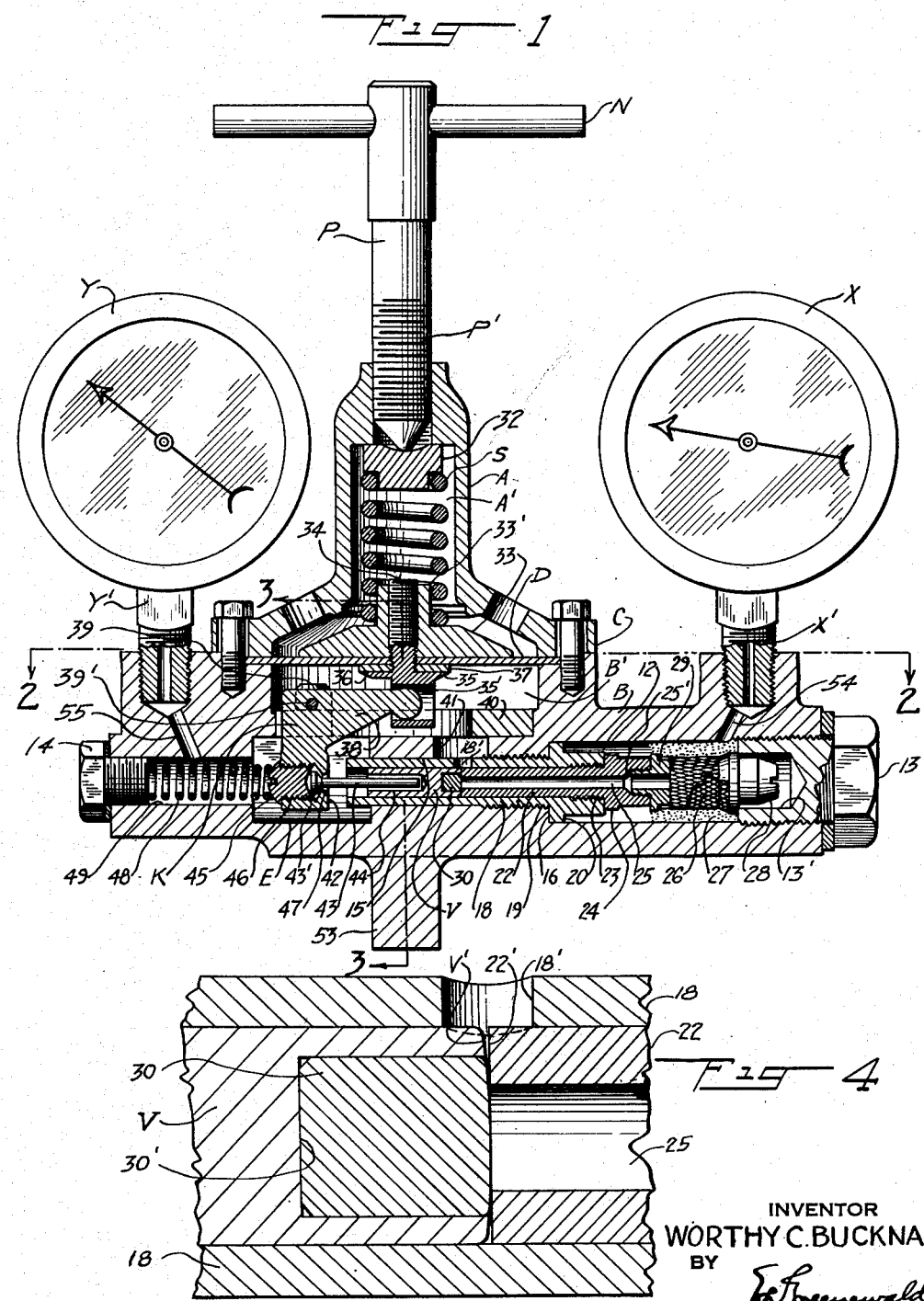

2,095,210

UNITED STATES PATENT OFFICE 2,095,210

FLUID REGULATOR

Worthy C. Bucknam, Mechanic's Falls, Maine, assignor, by mesne assignments, to Union Carbide and Carbon Corporation, a corporation of New York Original application December 30, 1927, Serial No. 243,730. Divided and this application November 27, 1934, Serial No. 754,974

14 Claims. (Cl. 50—26)

This invention relates to fluid regulators, and more particularly to an improved regulating valve designed to reduce and regulate the pressure of the gas delivered from a tank or cylinder of compressed gas, such as oxygen, acetylene, etc. Some features of this invention are also applicable to other types of fluid regulators and valves.

Accurate seating of the valve and nozzle is a primary requisite of a successful fluid-pressure regulator. Most regulators, when first made, comply with this requirement; but after a period of service, especially in controlling high pressures, they become leaky and unfit for close regulation particularly because of wear and corrosion of the valve seat and adjoining parts of the regulator. This may be remedied only by repairing or renewing some or all of the worn parts, which usually means returning the regulator to the manufacturer for repairs. Even then, it is quite often impossible to stop leakage, since a repaired or new valve seat, for example, may not properly line up with an old nozzle because the valve guide drilled in the body of the regulator casing has become worn and impossible to repair.

This invention aims to generally improve and simplify the construction of fluid controlling mechanisms, and especially to provide an improved nozzle and seat assembly for fluid valves and regulators which (1) shall remain leakproof and serviceable for a much longer period than those heretofore known; and (2) shall be so constructed that the user may easily substitute a new valve assembly in a leaky regulator without the expense and inconvenience incurred in sending the entire regulator to a factory or service station for repairs.

The above and other objects and the novel features of this invention will become apparent from the following description and the accompanying drawings, in which:

Fig. 1 is a vertical sectional view of a pressure-reducing gas regulator embodying this invention, parts being shown in elevation;

Fig. 2 is a sectional view of the same taken along line 2—2 of Fig. 1, parts being broken away and others being indicated by dotted lines;

Fig. 3 is a detail sectional view of the same, taken on the line 3—3 of Fig. 1, and of the cooperating portions of improved nozzle and valve seats; and Figs. 4 and 5 are detail views, on an enlarged scale, illustrating two types of seats which may be employed in the improved regulator.

As shown, my improved regulator comprises a pressure-responsive diaphragm D that divides the regulator casing C into two compartments A' and B', in the respective casing sections A and B. The compartment A' houses means such as an adjustable spring S bearing against the diaphragm to set the regulator for the desired service or delivery pressure, and the other compartment B' communicates directly with a low pressure service line L and contains the valve V and its diaphragm-operated actuating mechanism for controlling the admission of fluid from the supply pipe H, which may be coupled by a nut H' to a cylinder or other container of gas or fluid under relatively high pressure.

The supply pipe H is threaded into a recess 10 in a boss 10' on the rear side of the base section B, which recess communicates through a passage 11 with an inlet chamber 12. This chamber is part of a drilling that extends lengthwise through the base section B perpendicular to the axis of the diaphragm D and is closed at its opposite ends by the threaded caps 13 and 14 which bear against suitable sealing gaskets. Between its ends the said drilling comprises a bore 15 of smaller diameter than that of the chamber 12, leaving a shoulder at 16.

The improved valve and nozzle assembly comprises a quill or tube 18 that snugly fits the bore 15 and is secured in place by threads 19. A collar 20 on the quill abuts against the shoulder 16 and seals the chamber 12 at this point. The end of the quill including this collar is located in the chamber 12 and the opposite end may project beyond the end of the bore 15. The nozzle comprises a tube 22 which snugly fits into the quill 18 and is secured thereto by threads 23, and a collar 24 on the nozzle seats against the end of the quill to seal the joint at this point.

One end of the nozzle tube 22 terminates in the chamber 12, where suitable means may be provided to separate dust and moisture from the gas before it enters the longitudinal passage 25 that extends through the nozzle. For this purpose, I employ a cylindrical screen 26 surrounded by a non-inflammable fibrous covering 27, such as cotton impregnated with a suitable fireproofing solution. One end of the screen is soldered to a metal plug 28 and its opposite end is soldered to a nipple 29 that is screwthreaded into a counter bore 25' at the end of the passage 25 of the nozzle 22. The inner end of the cap 13 bears against and is recessed at 13' to receive and center the plug 28. The nipple 29 is formed to fit and is in threaded connection with the counterbored portion 25' of the nozzle passage 25, which latter registers with the passage through the nipple.

The orifice of the nozzle passage 25 is located opposite a hole 18' through the quill 18, the flow of gas to the hole 18' being controlled by a slightly yieldable seat 30 carried by the valve V. The seat 30 desirably consists of a block of hard rubber secured into a cavity 30' in the end of the valve and is of substantially larger diameter than the outlet orifice of passage 25 so that the seat 30 will engage a substantial area of the flat seating surface 22' at the end of the nozzle 22. In order to obtain a better seal between the surface 22', the seat 30 and the annular sealing surface V', the latter is bevelled or inclined at a slight angle (less than 2°) to the flat face 22', as best shown in Fig. 4. By this construction, the seat 30 is always properly presented to the nozzle orifice and adjoining face 22', and any wear at this point is compensated. To further materially prolong the life of the valve and reduce possibility of leakage, I prefer to make the nozzle 22 and the metal part of the valve V of metal that is much more resistant to oxidation and wear than heat-treated or hardened steel. For this purpose, I may use metals such as stainless steel, chrome iron, chromium plated steel, or the like; so that these parts will be less liable to wear during a long period of service and less apt to oxidize or corrode because of moisture, etc., in the gas.

The valve V snugly fits the quill 18 and its sliding movement relatively to the nozzle face 22' is controlled by the diaphragm D which may be set to obtain the desired pressure reduction by turning the screw P. This screw is adjustable in a threaded opening P' by means of a handle N, and its inner end engages the upper spring seat 32. The lower end of the spring S bears against a plate 33 that is clamped to the top side of the diaphragm D. One or two of the lower coils of the spring encircles a neck 33' of the plate 33 to center the spring and hold it in place. The plate 33 and its neck have a central threaded bore which registers with a central hole in the diaphragm D to receive the threaded stem 34 of a connecting yoke 35 which has a flange 36 that presses a gasket 37 against the under side of the diaphragm around the hole in the latter, the stem 34 serving to rigidly clamp the plate 33 and yoke 35 to the diaphragm. The yoke 35 has a crossbore or recess 35' to loosely receive the rounded head at the end of the horizontal arm 38 of a bellcrank K which is pivoted at 39' in lugs 39 on an annular supporting plate 40 which is secured to the bottom of the chamber B' by screws 40'. A hole or port 41 drilled through the bottom of the chamber B' into the bore 15 establishes communication from the port 18' of the quill to the chamber B' through the space within the plate 40.

The vertical arm 42 of the bellcrank K depends into a chamber E at one end of the bore 15, and is operatively coupled to the valve V, as by a pin 43 which extends into an axial socket 44 in the rear end of the valve. The pin 43 may be removably secured to the bellcrank by a screw 45 which has a rounded recess in its inner end fitting the rounded head 43' of the pin to hold the rounded under side of said head against a curved seat in the bottom of the threaded cavity 46 in the arm 42, into which cavity these parts are secured. The shank of the pin projects through an aperture 47 in the bottom of the cavity and is free to move laterally to keep the pin 43 alined with the socket 44 and prevent binding of these parts when the bellcrank is adjusted about its pivot 39'. A spring 48 may be inserted in a cavity or bore 49 in line with the bore 15, and arranged to seat against the head of the screw 45 and against the inner end of the screw 14, to steady the movements of the bellcrank.

By turning the handle N to unscrew the screw P, the valve V may be moved toward the end seating face of the nozzle 22, and the gas or other fluid may be completely shut off, when desired. When tightly closed, the yieldable seat 30 of the valve is sufficiently compressed against the seating face 22' to bring the seating face V' of the valve into sealing contact with the nozzle, thus providing a combined seal and also reducing wear on the sealing block 30. When the handle N is turned to open the valve, the gas pressure in the nozzle passage 25 of course acts to unseat the valve to the amount determined by the setting.

As best shown in Figs. 2 and 3, the low pressure delivery pipe L, which leads to a blowpipe or other gas consuming device, is coupled to the casing section B by a nipple 50 which communicates through a passage 51 and a hole 52 in the plate 40 with the low pressure chamber B'. The nipple 50 desirably projects from the front and lower side of the bottom casing section B which has a lug 53 located so as to protect the nipple 50.

Suitable high and low pressure gages X and Y are mounted on the regulator, nipples X' and Y' thereof being screwed into recesses on the upper sides of extensions which carry the screws 13 and 14. The gage X communicates through a passage 54 with the inlet chamber 12, the packing 27 being also located across the entrance of the passage 54 to exclude dust and moisture from the gage. The gage Y communicates through a passage 55 with the chamber 49 that constitutes part of the low pressure chamber B'. The gages X and Y are mounted on the top side of the regulator casing and on opposite sides of the housing A which carries the adjusting screw P.

Fig. 5 illustrates a modified type of valve which may be employed in place of the one shown in Fig. 4. Here, an annular seat 56 of yieldable material such as hard rubber is disposed in an annular recess 57 in the valve V. The height of the ring seat 56 is such that it normally projects slightly beyond the sealing face 58 of the valve so that a perfect seal will be obtained with the face 22' of the nozzle when the valve is tightly closed, whereupon the metal faces 58 and 22' will also contact on both inner and outer sides of the seat to increase the sealing area and to reduce wear on the seat 56. Moreover, the inner diameter of the seat 56 is materially greater than the diameter of the nozzle passage 25 so that there will be a substantial mass of metal directly opposite the outlet orifice of the passage 25, as at 58', to dissipate heat developed by the compression of residual gas in the passage 25 when the supply cylinder valve, or other valve which may control the supply of gas to the supply pipe H, is first opened. Otherwise the construction in Fig. 5 is similar to Fig. 4.

The operation of the regulator will be apparent from the foregoing description and the drawings. It will be understood that the screw P is in a vertical position when the regulator is secured to a compressed gas cylinder by the coupling H', which has the advantage that the handle is out of the way and will not catch on the clothing of workmen, and also reduces possibility of injury to workmen should the screw P or top section A become loosed and blow off of the bottom section B. In case leakage develops at the valve, the entire valve and nozzle assembly may be readily removed through the passage 12 by first removing the cap 13 and the filter screen and then unscrewing the quill 18 for repairs or replacement by a perfect assembly. The end of the quill 18 in the chamber 12 is of hexagon or other suitable shape to receive a socket wrench inserted into the chamber after the cap 13 is removed; and the nozzle 22 and nipple 29 may likewise be provided with wrench-receiving portions, while the plug 28 may have a screw-driver slot for tightening these parts. The improved arrangement simplifies the assembly and perfect fit of the nozzle and valve seating surfaces, and the bore of the quill insures a perfect alinement of these parts. Moreover, by renewing the quill 18 it is unnecessary to discard an entire regulator casing section as heretofore, where the valve and nozzle were fitted directly into a bore in the regulator casing. The admission of particles of dust and moisture, which frequently cause leakage, is substantially eliminated; and by making the nozzle, valve and quill of wear and corrosion resistant metal the life of these parts is greatly increased and the valve may be relied upon to very accurately hold the delivery pressure at any particular setting.

Although the particular regulator here shown for the purpose of illustrating my invention is described in detail, it is to be understood that various changes may be made in this construction and the particular embodiment of the invention may be varied without departing from the principles of the invention.

This application is a division of my copending application Serial No. 243,730, filed December 30, 1927, for Fluid regulator, now Patent No. 2,016,540, granted October 8, 1935.

I claim:

1. In a fluid regulator, a control valve comprising a casing defining a chamber, a nozzle in the chamber having an outlet orifice; a valve member within the said chamber and having a recess of larger diameter than said orifice; a yieldable block in said recess and projecting slightly beyond the latter, the said block being adapted to engage said nozzle around said orifice; said valve member and said nozzle also having metal seating faces adapted to engage each other immediately following the engagement of the said block and nozzle to increase the sealing area around said orifice, while permitting but slight deformation of the yieldable block.

2. In a fluid regulator, a control valve comprising a casing defining a chamber, a nozzle in the chamber having an outlet orifice; a valve member within the said chamber and having a recess of larger diameter than said orifice; a yieldable block in said recess and projecting slightly beyond the latter, the said block being adapted to engage said nozzle around said orifice; said valve member and said nozzle also having metal seating faces disposed at a slight angle to each other and adapted to engage each other to increase the sealing area around said orifice, immediately following the sealing engagement of the said block and nozzle.

3. In a fluid regulator, a control valve comprising a casing defining a chamber, a nozzle in the chamber having an outlet orifice; a valve member within the said chamber and having a recess of larger diameter than said orifice; a yieldable block in said recess adapted to project slightly beyond the recess and to engage said nozzle around said orifice; said valve member and said nozzle also having metal seating faces disposed at a slight angle to each other and adapted to engage each other to increase the sealing area around said orifice, immediately following the sealing engagement of the said block and nozzle, the said recess and the yieldable block being annular.

4. In a fluid regulator, the combination with a casing defining a chamber, of a nozzle in the chamber having an outlet orifice surrounded by an annular face; a metallic valve member presenting a face to the annular face of said nozzle and having in the said face a recess of larger diameter than the inner diameter of said annular face but of smaller diameter than the outer diameter of said annular face; and a yieldable filling in said recess having a surface adapted first to engage the said face and thereafter to yield sufficiently to permit subsequent metal-to-metal engagement of the face of said valve member and said annular face, while minimizing deformation of the said yieldable filling.

5. A fluid regulator as defined in claim 4, in which the outer margin of the annular face of the nozzle, and the outer margin of the face of the valve member adapted for engagement therewith, are slightly inclined relative to each other.

6. A fluid regulator as defined in claim 4, in which the said recess in the valve member is annular.

7. A fluid regulator as defined in claim 4, in which the recess in said valve member is annular, its inner diameter being greater than the inner diameter of the annular face of the nozzle and its outer diameter being less than the outer diameter of the annular face of the nozzle.

8. A fluid regulator as defined in claim 4, in which the outer margin of the annular face of the nozzle and the outer margin of the face of the valve adapted for engagement therewith are slightly inclined relative to each other, and in which the said surface of the yieldable filling extends slightly beyond the said face of the valve member.

9. A fluid regulator as defined in claim 4, in which the outer margin of the annular face of the nozzle and the outer margin of the face of the valve member adapted for engagement therewith are slightly inclined relative to each other, and in which the said surface of the yieldable filling is bevelled inwardly in a direction toward the said nozzle and extends slightly beyond the said face of the valve member.

10. In a fluid pressure regulator, the combination with a casing defining a chamber, of a nozzle within the chamber and having an outlet orifice surrounded by an annular face; a metallic valve member presenting a face to the annular face of said nozzle and having an annular recess therein, the inner diameter of the annular recess being sufficiently greater than the inner diameter of the annular face of the nozzle to provide a substantial mass of metal opposite the nozzle orifice for conducting away heat present in the fluid flowing past the said orifice, the outer diameter of the recess being less than the outer diameter of the annular face of the nozzle; and a yieldable material in said recess having a surface adapted to extend slightly beyond the said face of the valve member.

11. A fluid regulator as defined in claim 10, wherein at least the said nozzle and valve member are made of highly wear- and oxidation-resistant metal.

12. In a fluid regulator adapted for the regulation of high-pressure fluids, a control valve comprising a casing defining an enclosed chamber; a nozzle in the said chamber having an outlet orifice; a valve member having an outer peripheral sealing surface of metal facing the nozzle, and having an auxiliary sealing surface of a yieldable material extending slightly beyond the said metal sealing surface and toward the nozzle; each of the said surfaces being adapted to cooperate successively with the said nozzle outlet orifice to provide successive fluid-tight seals between the said valve and nozzle while permitting but slight deformation of the yieldable material under the valve-sealing pressure.

13. A fluid regulator as defined in claim 12, wherein at least one of the respective surfaces adapted sealingly to engage the nozzle is slightly bevelled.

14. A fluid regulator as defined in claim 12, wherein the said auxiliary sealing surface comprises an annular body of yieldable material secured in a recess in the valve member.

WORTHY C. BUCKNAM.